(12) United States Patent
Gong et al.

(10) Patent No.: US 11,019,569 B2
(45) Date of Patent: *May 25, 2021

(54) POWER MANAGEMENT FOR WIRELESS NETWORKS

(71) Applicant: INTEL CORPORATION, Santa Clara, CA (US)

(72) Inventors: Xiaohong Gong, Sunnyvale, CA (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/911,540

(22) Filed: Mar. 5, 2018

(65) Prior Publication Data

US 2019/0342835 A1 Nov. 7, 2019

Related U.S. Application Data

(63) Continuation of application No. 14/866,937, filed on Sep. 26, 2015, now Pat. No. 9,913,219, which is a
(Continued)

(51) Int. Cl.
*H04W 52/02* (2009.01)
*H04W 84/18* (2009.01)
(Continued)

(52) U.S. Cl.
CPC ...... *H04W 52/0235* (2013.01); *G06F 1/3209* (2013.01); *G06F 1/3228* (2013.01);
(Continued)

(58) Field of Classification Search
CPC ......... H04W 52/0216; H04W 52/0235; H04W 76/14; H04W 76/28; H04W 84/18; Y02D 30/70; G06F 1/3209; G06F 1/3228
See application file for complete search history.

(56) References Cited

U.S. PATENT DOCUMENTS

| 7,167,732 B2* | 1/2007 | Choi | H04W 52/0229 455/574 |
| 7,369,518 B2* | 5/2008 | Lee | H04W 52/0216 370/311 |

(Continued)

FOREIGN PATENT DOCUMENTS

EP 2141586 A1 1/2010

OTHER PUBLICATIONS

Kneckt et al., "Power save for 802.11s", IEEE P802.11 Wireless LANs, Jan. 16, 2008, IEEE 802.11-08/0168r1, 9 pages.*
(Continued)

*Primary Examiner* — Ahmed Elallam
(74) *Attorney, Agent, or Firm* — Kacvinsky Daisak Bluni PLLC

(57) ABSTRACT

Embodiments provide techniques for device power management in wireless networks. For instance, an apparatus may include a power management module, and a transceiver module. The power management module determines a beacon interval and a wakeup interval. The transceiver module to send a transmission to one or more remote devices that includes the beacon interval and the wakeup interval. The beacon interval indicates a time interval between consecutive beacon transmissions of the apparatus, and the wakeup interval indicates a time interval between when the apparatus receives two consecutive beacons from a peer device.

36 Claims, 9 Drawing Sheets

Related U.S. Application Data continuation of application No. 14/094,666, filed on Dec. 2, 2013, now Pat. No. 9,226,240, which is a continuation of application No. 13/480,515, filed on May 25, 2012, now Pat. No. 9,167,525, which is a continuation of application No. 12/317,099, filed on Dec. 19, 2008, now Pat. No. 8,203,984.

(51) Int. Cl.
 G06F 1/3209 (2019.01)
 G06F 1/3228 (2019.01)
 H04W 76/14 (2018.01)
 H04W 76/28 (2018.01)

(52) U.S. Cl.
 CPC ....... *H04W 52/0216* (2013.01); *H04W 76/14* (2018.02); *H04W 76/28* (2018.02); *H04W 84/18* (2013.01); *Y02D 30/70* (2020.08)

(56) References Cited

U.S. PATENT DOCUMENTS

| | | | | |
|---|---|---|---|---|
| 7,522,547 B2 * | 4/2009 | Lee | ............. | H04L 12/5601 370/252 |
| 7,551,948 B2 * | 6/2009 | Meier | ............. | H04L 29/12028 455/574 |
| 7,656,831 B2 * | 2/2010 | Gao | ............. | H04W 52/0229 370/311 |
| 7,697,457 B2 * | 4/2010 | Igarashi | ............. | H04W 72/10 370/254 |
| 7,877,117 B2 * | 1/2011 | Abhishek | ............. | H04W 52/0216 455/574 |
| 8,189,506 B2 * | 5/2012 | Kneckt | ............. | H04W 52/0216 370/318 |
| 8,203,984 B2 * | 6/2012 | Gong | ............. | G06F 1/3209 370/311 |
| 8,203,985 B2 * | 6/2012 | Gong | ............. | H04W 52/0216 370/311 |
| 8,274,894 B2 * | 9/2012 | Kneckt | ............. | H04W 52/0251 370/235 |
| 8,295,216 B2 * | 10/2012 | Jokela | ............. | H04W 74/006 370/311 |
| 8,355,380 B1 * | 1/2013 | Banerjea | ............. | H04W 40/10 370/331 |
| 8,374,242 B1 | 2/2013 | Lewis et al. | | |
| 8,406,699 B2 * | 3/2013 | Mashimo | ............. | H04L 12/12 455/68 |
| 8,477,674 B2 * | 7/2013 | Kneckt | ............. | H04L 12/12 370/312 |
| 8,675,620 B1 * | 3/2014 | Benveniste | ............. | H04W 52/0216 370/338 |
| 8,797,930 B2 * | 8/2014 | Wentink | ............. | H04W 52/0235 370/311 |
| 9,088,946 B2 * | 7/2015 | Wentink | ............. | H04W 52/0216 |
| 9,167,525 B2 * | 10/2015 | Gong | ............. | G06F 1/3209 |
| 9,223,744 B1 * | 12/2015 | Benveniste | ............. | H04W 52/0216 |
| 9,226,240 B2 * | 12/2015 | Gong | ............. | G06F 1/3209 |
| 9,332,496 B2 * | 5/2016 | Jan | ............. | H04W 52/0216 |
| 9,445,253 B2 * | 9/2016 | Wentink | ............. | H04W 8/005 |
| 9,877,281 B2 * | 1/2018 | Wentink | ............. | H04W 52/0206 |
| 9,913,219 B2 * | 3/2018 | Gong | ............. | G06F 1/3209 |
| 10,244,473 B2 * | 3/2019 | Kneckt | ............. | H04W 52/0216 |
| 10,327,158 B2 * | 6/2019 | Wang | ............. | H04W 24/02 |
| 2003/0172258 A1 | 9/2003 | Krishnan | | |
| 2004/0253996 A1 * | 12/2004 | Chen | ............. | H04W 52/0216 455/574 |
| 2005/0221869 A1 * | 10/2005 | Liu | ............. | G06F 1/3209 455/574 |
| 2006/0253735 A1 * | 11/2006 | Kwak | ............. | G06F 1/3203 714/12 |
| 2006/0285527 A1 * | 12/2006 | Gao | ............. | H04W 52/0216 370/338 |
| 2007/0086471 A1 * | 4/2007 | Igarashi | ............. | H04W 72/10 370/412 |
| 2007/0242634 A1 * | 10/2007 | Calcev | ............. | H04W 52/0225 370/318 |
| 2007/0281658 A1 * | 12/2007 | Chou | ............. | H04W 52/0216 455/343.2 |
| 2008/0037570 A1 * | 2/2008 | Kim | ............. | H04W 52/0225 370/406 |
| 2008/0225768 A1 * | 9/2008 | Wentink | ............. | H04W 52/0216 370/311 |
| 2008/0226071 A1 * | 9/2008 | Braskich | ............. | H04L 63/0869 380/258 |
| 2009/0010190 A1 * | 1/2009 | Gong | ............. | H04L 45/26 370/311 |
| 2009/0067373 A1 * | 3/2009 | Kneckt | ............. | H04W 52/0216 370/328 |
| 2009/0097428 A1 * | 4/2009 | Kneckt | ............. | H04W 52/0216 370/311 |
| 2009/0122755 A1 * | 5/2009 | Seok | ............. | H04W 28/06 370/329 |
| 2009/0147714 A1 * | 6/2009 | Jain | ............. | H04W 52/0216 370/311 |
| 2009/0164996 A1 | 6/2009 | Baeuerle et al. | | |
| 2009/0196211 A1 * | 8/2009 | Wentink | ............. | H04W 52/0235 370/311 |
| 2009/0225731 A1 * | 9/2009 | Kneckt | ............. | H04L 1/1685 370/338 |
| 2009/0232042 A1 * | 9/2009 | Kneckt | ............. | H04L 12/12 370/312 |
| 2009/0232119 A1 * | 9/2009 | Seok | ............. | H04W 80/02 370/338 |
| 2009/0268652 A1 * | 10/2009 | Kneckt | ............. | H04W 52/0235 370/311 |
| 2009/0274083 A1 * | 11/2009 | Wentink | ............. | H04W 8/005 370/311 |
| 2009/0279449 A1 * | 11/2009 | Kneckt | ............. | H04W 52/0251 370/253 |
| 2012/0176949 A1 * | 7/2012 | Meylan | ............. | H04W 52/0216 370/311 |
| 2014/0133379 A1 * | 5/2014 | Wang | ............. | H04W 24/02 370/311 |
| 2014/0354644 A1 | 12/2014 | Nystad | | |
| 2016/0174154 A1 * | 6/2016 | Wentink | ............. | H04W 52/0235 370/311 |

OTHER PUBLICATIONS

Supplementary European Search Report for European Patent Application No. 15868374, dated May 28, 2018, 2 pages.

* cited by examiner

POWER MANAGEMENT FOR WIRELESS NETWORKS

CROSS-REFERENCE OF RELATED APPLICATIONS

This application is a continuation of, claims the benefit of and priority to, previously filed U.S. patent application Ser. No. 14/866,937 filed Sep. 26, 2015, and entitled "Power Management for Wireless Networks", which is a continuation of U.S. patent application Ser. No. 14/094,666 filed Dec. 2, 2013, and entitled "Power Management for Wireless Networks", which is a continuation of U.S. patent application Ser. No. 13/480,515 filed on May 25, 2012, which is a continuation of U.S. patent application Ser. No. 12/317,099, filed on Dec. 19, 2008, the subject matter of which are hereby incorporated by reference in their entireties.

BACKGROUND

Wireless communications capabilities are increasingly being integrated into portable devices, including laptop computers, handheld devices (such as personal digital assistants (PDAs)), and mobile phones. The integration of such capabilities can provide users with anywhere and anytime connectivity to information resources.

Power consumption is a key feature for such devices. For instance, lower power consumption levels correspond to increased operational times between necessary battery charging sessions. As a result of this, the device user's experience may be enhanced.

Wireless mesh networks operate in accordance with a decentralized and collaborative approach. For instance, the Institute for Electrical and Electronics Engineers (IEEE) 802.11s standard provides for wireless networks composed of multiple devices (called mesh points). These devices form links among them. Moreover, information can be routed through these links in accordance with various routing protocols.

Current drafts of IEEE 802.11s (such as IEEE 802.11s Draft Standard 1.08) provide power management mechanisms that aim to conserve device power. However, these mechanisms often result in undesirable network operations.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for device power management in wireless networks. For instance, an apparatus may include a power management module, and a transceiver module. The power management module determines a beacon interval and a wakeup interval. The transceiver module to send a transmission to one or more remote devices that includes the beacon interval and the wakeup interval. The beacon interval indicates a time interval between consecutive beacon transmissions of the apparatus, and the wakeup interval indicates a time interval between when the apparatus receives two consecutive beacons from a peer device. Through the employment of such techniques efficient network operation may be advantageously achieved.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
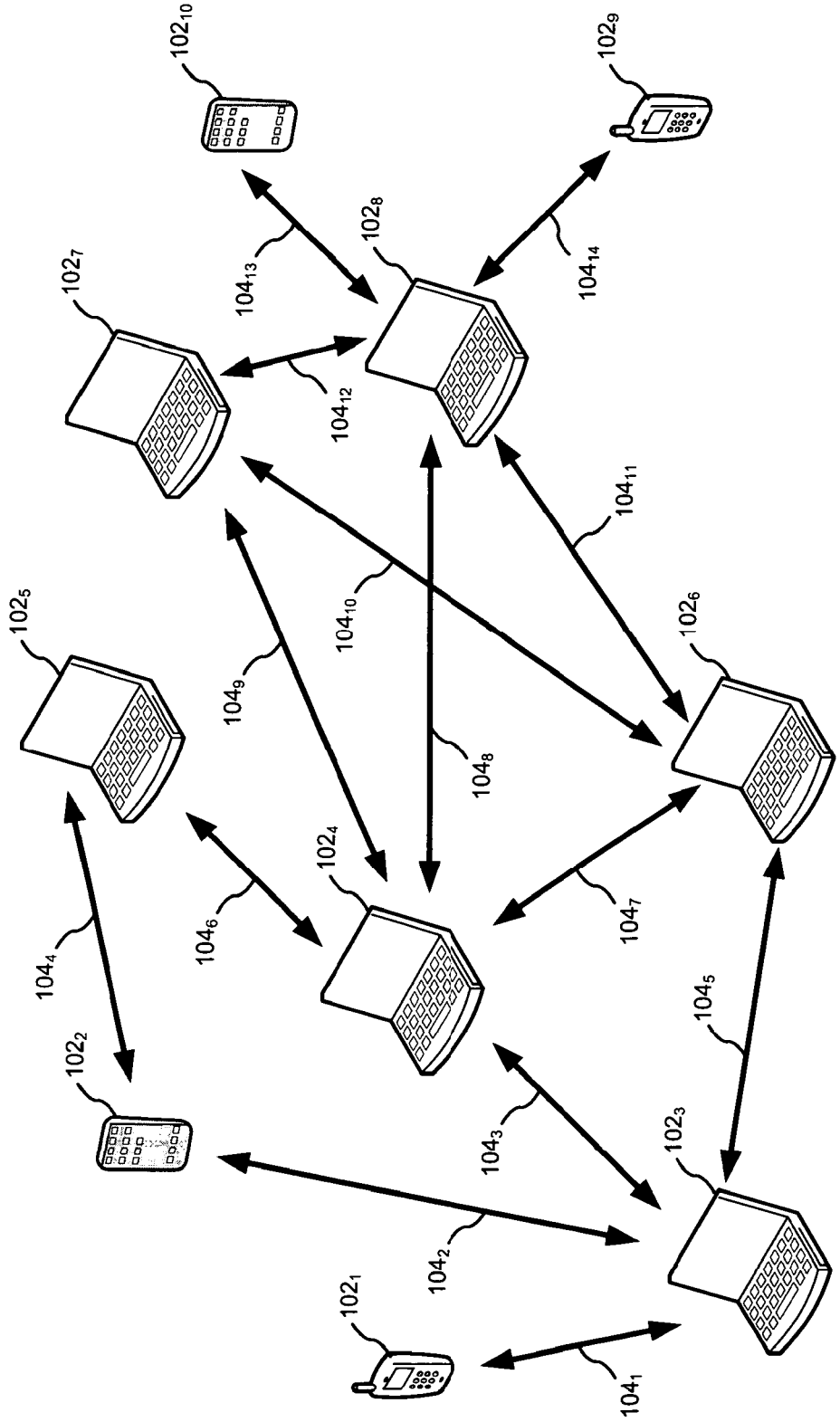
FIG. 1 is a diagram of an exemplary operational environment.

FIG. 1 is a diagram of an exemplary operational environment 100 in which the techniques described herein may be employed. As shown in FIG. 1, this environment includes multiple devices $102_1$-$102_{10}$. Also, FIG. 1 shows peer links $104_1$-$104_{17}$ among these devices.

A mesh network includes two or more mobile computing devices that have set up peer links among them. Accordingly, devices $102_1$-$102_{10}$ have formed a mesh network 106. Therefore, devices $102_1$-$102_{10}$ are also referred to herein as mesh points (MPs) $102_1$-$102_{10}$.

MPs $102_1$-$102_{10}$ may each be various types of devices. Exemplary devices include laptop computers, desktop computers, personal digital assistants (PDAs), Ultra-Mobile personal computers (UMPCs), and Mobile Internet Devices (MIDs). However, embodiments are not limited to these device types.

Typically, mesh network operations are not determined by a central controller. Instead, such decision making is usually distributed (or collaborative) among the network's MPs. Information pertaining to such collaborative decision making may be exchanged among MPs through transmissions call beacons. During operation, the MPs independently send out beacons at their respective target beacon transmission times (TBTTs).

Moreover, MPs, may operate in accordance with various modes and states. For example, MPs may operate in either an active mode or a power saving mode. In the active mode, an MP is continually able to exchange information with other devices. However, in the power saving mode, an MP is not always available to exchange such information. Further details regarding active and power saving modes are described below with reference to FIG. 2.

Thus, in the context of FIG. 1, each of MPs $102_1$-$102_{10}$ are not active at all times. Consequently, it can be a daunting task to achieve collaboration (or distributed decision making) among MPs so that they may operate in power saving modes.

The power management schemes proposed in the IEEE 802.11s Draft Standard 1.08 are mainly based on infrastructure mode operation (in which devices communicate with each other through an access point). Also, this draft standard provides an automatic power save delivery (APSD) operation (defined in section 11A.12.6) that only works when one MP is not in power saving mode or when there is a central control entity Further, the IEEE 802.11s Draft Standard version 1.08 requires an MP to synchronize with its peer MPs before entering a power saving mode. This draft standard provides a peer link offset synchronization scheme to accomplish such synchronization. The peer link offset synchronization scheme forbids an MP from entering the power saving mode until it has informed all of its peer MPs through unicast messages. Unicast messages are required in this scheme because broadcast messages are considered unreliable and may cause ambiguity in an MP's knowledge of power management states being employed by other MPs in the mesh network.

Embodiments provide advantages over existing techniques. For instance, embodiments provide completely distributed operation. In addition, embodiments facilitate flexible power management through two intervals: a beacon interval and a wakeup interval.

Figure 2:
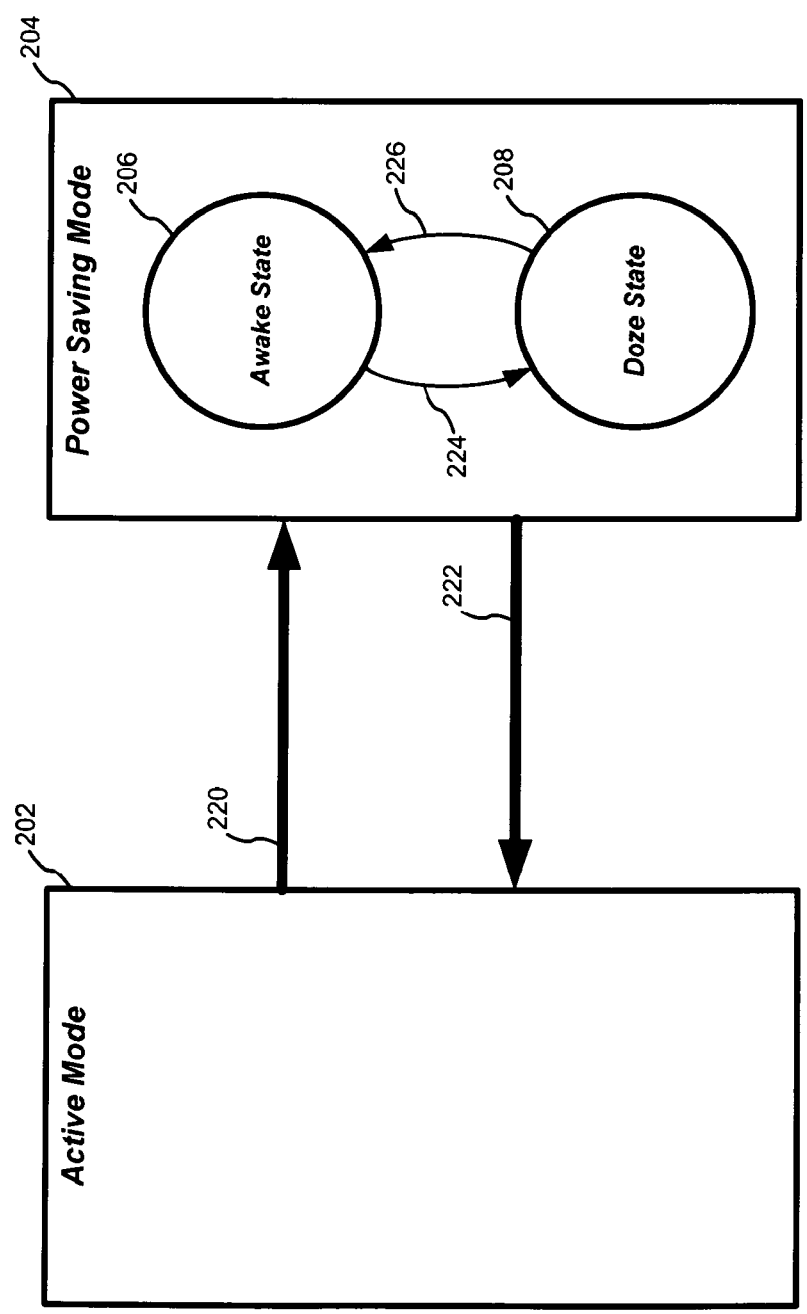
FIG. 2 is a diagram showing exemplary operational modes and states for a device.

As described above, MPs may operate in accordance with various modes and states. FIG. 2 is a diagram providing examples of such modes and states. In particular, FIG. 2 shows an active mode 202, and a power saving mode 204.

In embodiments, an MP in power saving (PS) mode 204 may operate in one of two states. These states are an awake state 206 and a doze state 208. In awake state 206, the MP is fully powered, and is able to transmit or receive frames. However, in doze state 208, the MP consumes very low power, and is not able to transmit or receive. As indicated by arrows 224 and 226, the MP may alternate between awake state 206 and doze state 208 while operating in PS mode 204. This alternation may be determined by specified time intervals, as well as by frame transmission and reception rules.

In active mode 202, the MP operates in an awake state (such as awake state 206) all the time. As indicated by arrows 220 and 222, the MP may transition between active mode 202 and PS mode 204. Such transitions may be based on various factors, such as user settings.

Further details regarding MP operations in PS mode 204 are now provided.

An MP in PS mode 204 (also called a "PS MP") transmits its own beacons at a pre-determined beacon interval (which are indicated by target beacon transmission times (TBTT)). Further, the PS MP wakes up (i.e., enters awake state 206 from the doze state 208) to receive its peers' beacons and/or broadcast messages, and to also maintain synchronization and peer links. A PS MP does not have to wake up to receive every beacon from its peers. As an example, a PS MP may instead decide to receive every other beacon, every delivery traffic indication message (DTIM) beacon, or every other DTIM beacon transmitted by a peer.

The time interval between when a PS MP receives two consecutive beacons from a peer MP is referred to herein as the wakeup interval. The wakeup interval is per peer link based. Thus, a PS MP may employ multiple wakeup intervals. Moreover, each wakeup interval can be negotiated between the PS MP and the corresponding peer MP. Furthermore, the wakeup interval(s) and beacon interval(s) employed by a PS MP may be implementation dependent. For instance, wake up interval(s) and beacon interval(s) may be based on factors, such as traffic load(s) to/from peer MP(s), clock synchronization accuracy, user selection, and so forth.

In embodiments, an MP may define the length of its beacon interval and its wakeup interval(s) before it enters PS mode 204. Also, in embodiments, the MP may inform its peer MPs of its beacon interval and target beacon transmission time (TBTT). By so doing, the MP's peers can wake up at the right time to receive the MP's beacons. Optionally, an MP's wakeup interval(s) may be negotiated with its peer MP(s). Through such negotiations, the peer MP(s) may schedule their broadcast transmission(s) to the PS MP. Further, a PS MP may also request its peer MPs to send broadcast traffic as unicast frames to itself.

In embodiments, a PS MP advertises an Awake Window in its beacon. The awake window may be indicated in an information element (IE), such as the IE of FIG. 7. However, other forms of indication may be employed. The start of the Awake Window is measured from PS MP's TBTT. This advertised awake window indicates how long the PS MP will remain awake after sending a beacon. In contrast, a conventional PS MP returns to doze state 208 right after sending its beacon.

Figure 3:
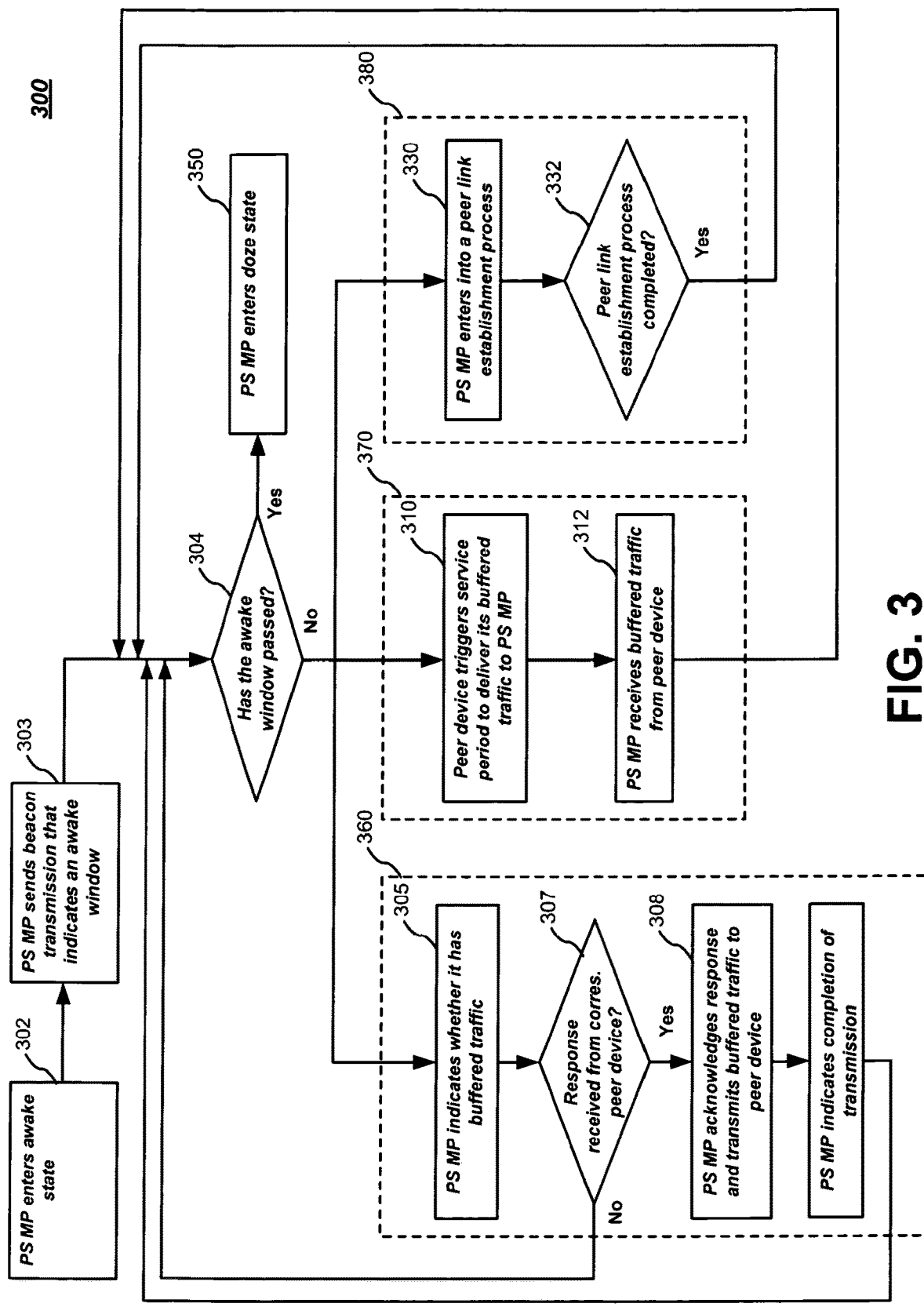
FIG. 3 is a flow diagram showing an exemplary device operation.

FIG. 3 illustrates an embodiment of a logic flow. In particular, FIG. 3 illustrates a logic flow 300, which may be representative of the operations executed by one or more embodiments described herein. Although FIG. 3 shows a particular sequence, other sequences may be employed. Also, the depicted operations may be performed in various parallel and/or sequential combinations.

The flow of FIG. 3 involves exemplary device operations during power saving mode 204. These operations are described with reference to a PS MP and one or more remote devices. These remote device(s) may be peer devices. Alternatively, these remote device(s) may seek to establish a peer relationship with the power saving device. The operations of FIG. 3 may occur in the context of FIG. 1. Moreover, the PS MP and/or the remote device(s) may include features, such as those described herein with reference to FIGS. 2 and 8.

At a block 302, the PS MP enters awake state 206. Upon entering awake state 206, the PS MP sends a beacon transmission at a block 303. This beacon provides an indication of an awake window time period. For example, this beacon may include the awake window information element described below with reference to FIG. 7. Embodiments, however, are not limited to employing this information element.

At a block 304, the PS MP determines whether the awake window time period has elapsed. If so, then operation proceeds to a block 350, where the PS MP enters doze state 208. Otherwise, performance of one or more paths may occur. For example, FIG. 3 shows a path 360 that involves the PS MP sending transmissions to a peer device, a path 370 that involves the PS MP receiving transmissions from a peer device, and a path 380 that involves the establishment of a new peer relationship. Such paths may be performed in various sequential and/or parallel orders.

FIG. 3 shows path 360 including blocks 305-308. At block 305, the PS MP indicates whether it has any buffered traffic (e.g., unicast traffic) for its peer devices. This indication may be included in a beacon transmission (such as the beacon sent at block 303). For instance, the PS MP may make this indication by setting one or more bits in its beacon frame. For example, in the context of 802.11s networks, the PS MP may set a bit in the traffic indication map (TIM) element that matches the peer device's peer link ID.

In turn, a peer device that receives this indication of buffered traffic (e.g., buffered unicast traffic) may send the PS MP a responsive transmission (such as a trigger frame) to initiate a packet reception period. Accordingly, as indicated by a block 307, the PS MP determines whether it has received such a responsive transmission from the peer device. If so, then operation proceeds to a block 308. Otherwise, operation may return to block 304.

At block 308, the PS MP acknowledges the trigger frame and transmits its buffered traffic to the peer device. This may involve sending multiple buffered packets to the peer device.

Once the buffered traffic has been sent, the PS MP may indicate its completion of data transmission to the peer device at a block 309. In the context of IEEE 802.11s networks, block 309 may include sending one or more data frames having an End of Service Period (EOSP) bit set. FIG. 3 shows that, following block 309, operation may return to block 304.

As described above, path 370 involves the PS MP receiving traffic from a peer device. FIG. 3 shows that path 370 may include blocks 310 and 312.

A peer device having buffered traffic to send to the PS MP stays awake during the awake interval following the power saving device's target beacon transmission time (TBTT). Thus, at a block 310, such a peer device may trigger a service period to deliver its buffered traffic to the PS MP. This may involve the peer device sending one or more triggering transmissions to the PS MP.

At a block 312, the PS MP receives the buffered traffic from the peer device. Following this, operation may return to block 304.

As indicated above, path 380 involves a peer connection being established between the PS MP and a remote device. FIG. 3 shows that path 380 may include blocks 330-332.

At block 330, the PS MP enters into a peer link establishment process. Details regarding an exemplary peer link establishment process are described below with reference to FIG. 4. Following completion (e.g., successful completion or unsuccessful completion) of the peer link establishment process, operation may return to block 304.

As described herein, embodiments may employ a peer link establishment process that may be performed after a device discovers another device that is in power saving mode 204 (e.g., a PS MP). As an example, such a process is performed at block 332 of FIG. 3.

Figure 4:
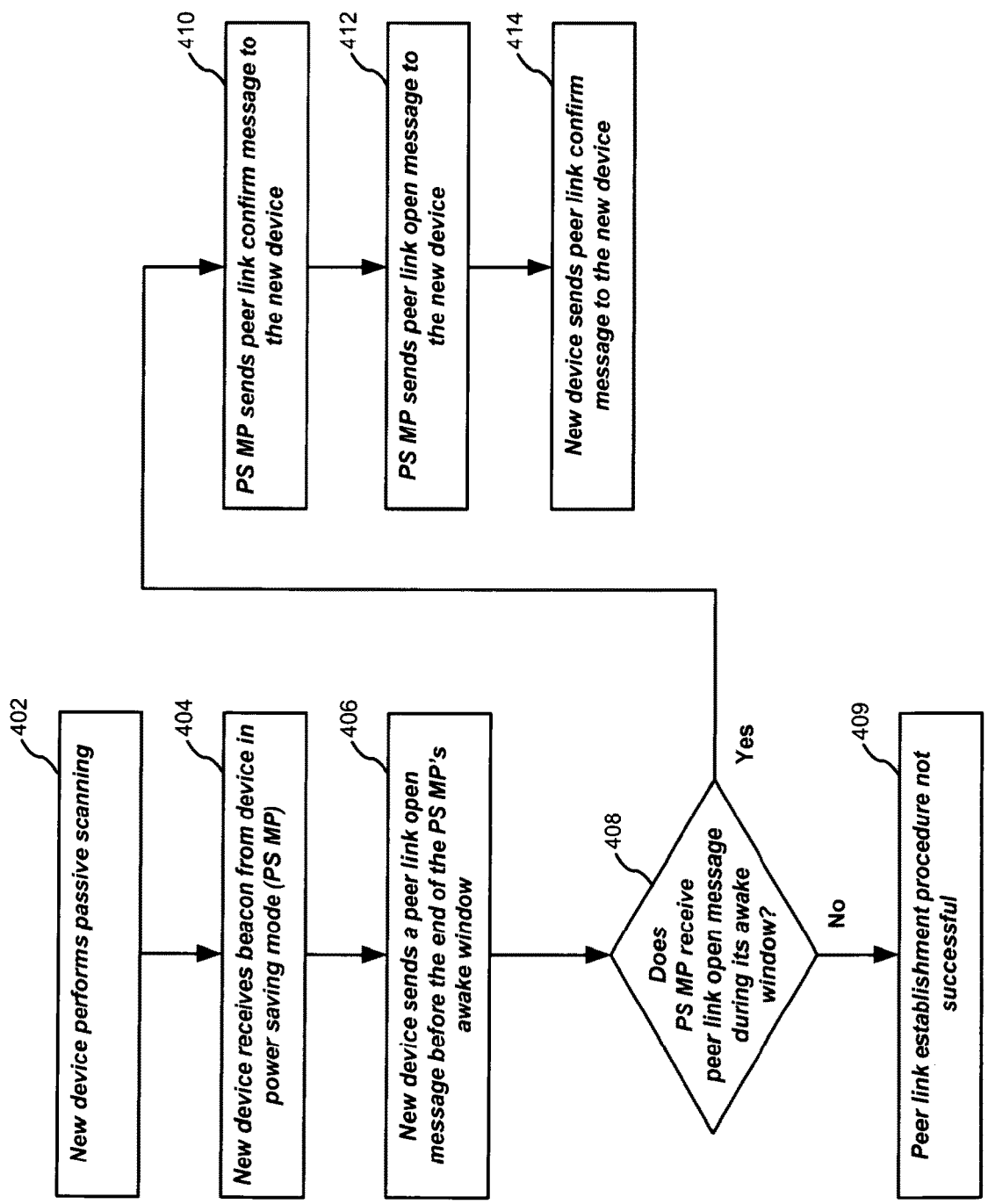
FIG. 4 is a flow diagram showing an exemplary peer link establishment process.

Accordingly, FIG. 4 is a flow diagram showing exemplary operations of a peer link establishment process. Although FIG. 4 shows a particular sequence, other sequences may be employed. Also, the depicted operations may be performed in various parallel and/or sequential combinations.

The operations in FIG. 4 are described with reference to a device (referred to as the "new device") that seeks to establish a peer relationship with a PS MP. These operations may occur in the context of FIG. 1. Moreover the new device and/or the power saving device may include features, such as those described herein with reference to FIGS. 2 and 8.

At a block 402 the new device may perform passive scanning to discover existing devices in a mesh network.

At a block 404, the new device receives a beacon from the PS MP. This beacon indicates the power saving device's awake window. For example, this beacon may include an awake window information element, such as the one described below with reference to FIG. 7. However, other awake window indications may be employed.

Based on this beacon, at a block 406, the new device attempts to send a peer link open message to the PS MP before the end of its awake window.

As indicated by a block 408, the PS MP determines whether it has received the peer link open message during its awake window. If so, then operations proceed to a block 410, and the PS MP remains in the awake state until the peer link establishment process has been completed (either successfully or unsuccessfully). Otherwise, if the peer link open message is not received during the PS MP's awake window, then the peer link establishment process is unsuccessfully completed (as indicated by a block 409).

At block 410, the PS MP sends a peer link confirm message to the new device. Also, at a block 412, the PS MP sends a peer link open message to the new device. In response to this peer link open message, the new device sends a peer link confirm message to the PS MP at a block 414.

Thus, this peer link establishment procedure involves a "double handshake" of peer link open and peer link confirm messages. Accordingly, a peer link is successfully established when both devices have sent and received peer link open and confirm messages.

Without an awake window, the PS MP may immediately go back to doze state 208 after transmitting a beacon or after responding to the Peer Link Open message from the new MP.

However, to ensure that a pending double handshake can be completed, embodiments require a PS MP to stay awake (e.g., remain in awake state 206) during its awake window, and to remain awake during a pending peer link set up process. This may advantageously promote fast and successful establishment of peer links.

Figure 5:
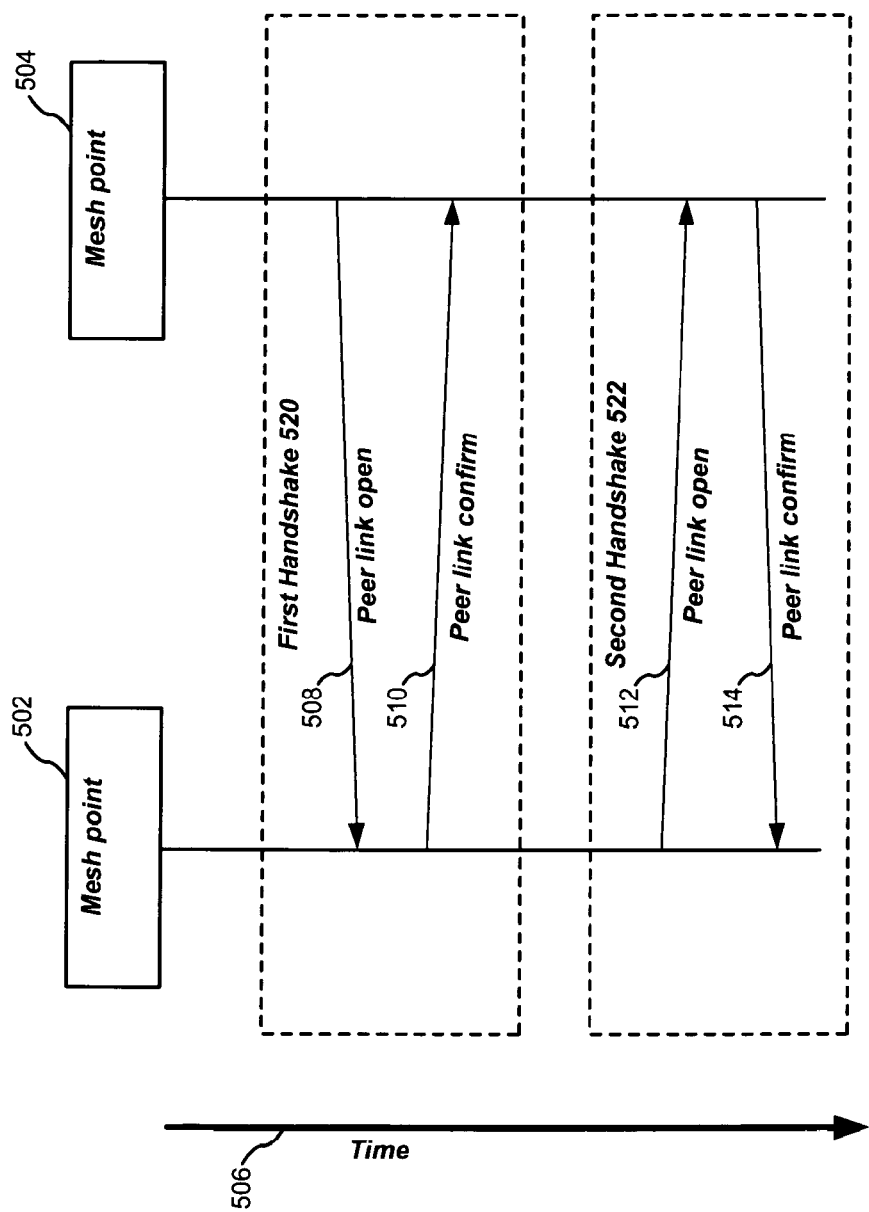
FIG. 5 is a diagram showing exemplary device interactions.

FIG. 5 is a diagram 500 showing exemplary device interactions. In particular, FIG. 5 shows interactions occurring between a first mesh point 502 (which is in awake state 206) and a second mesh point 504. These interactions occur along a time axis 506. Through these interactions, a peer link is established.

As described above with reference to FIG. 4, establishment of such peer links may involve a double handshaking procedure. Accordingly, FIG. 5 shows a first handshake 520 that begins with mesh point 504 sending a peer link open message 508. In response, mesh point 502 sends a peer link confirm message 510 to mesh point 504. FIG. 5 further shows a second handshake 522. This handshake involves mesh point 502 sending a peer link open message 512 to mesh point 504, and mesh point 504 responding by sending a peer link confirm message to mesh point 502.

Figure 6:
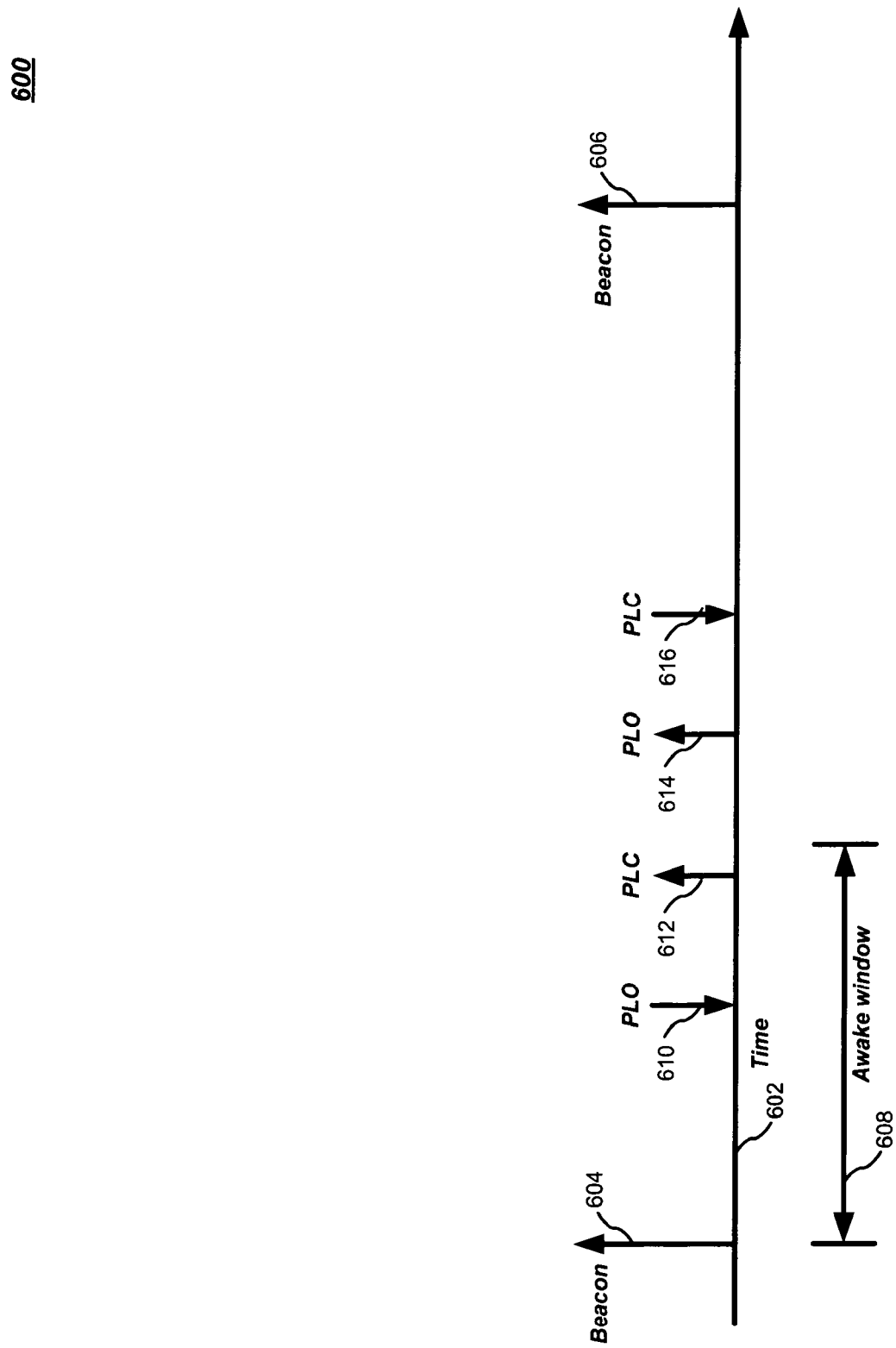
FIG. 6 is a diagram showing a sequence of transmissions.

FIG. 6 is a diagram 600 showing a sequence of transmissions along a time axis 602. These transmissions are shown from the perspective of a local mesh point in awake state 206. In this diagram, upward pointing arrows represent transmissions that are outgoing from the local mesh point, while downward pointing arrows represent transmissions that are incoming to the local mesh point.

As shown in FIG. 6, the local mesh point transmits beacons 604 and 606. Each of these beacons advertises an awake window. For example, beacon 604 advertises an awake window 608. Within this window, a peer link establishment procedure begins. In particular, the local mesh point receives a peer link open (PLO) message 610 from a remote mesh point. In response, the local mesh point sends a peer link confirm (PLC) message 612 to the remote device. These two messages comprise a first handshake. As a second handshake, the local mesh point transmits a PLO message 614. In response, a PLC message 616 is received from the remote mesh point.

Through the exchange of these messages, a peer link is established between the local mesh point and the remote mesh point. FIG. 6 shows that this peer link establishment procedure extends beyond awake window 608. However, as described above with reference to FIG. 4, initiation of this procedure by the remote mesh point causes the local mesh point to remain awake until the procedure is completed.

Figure 7:
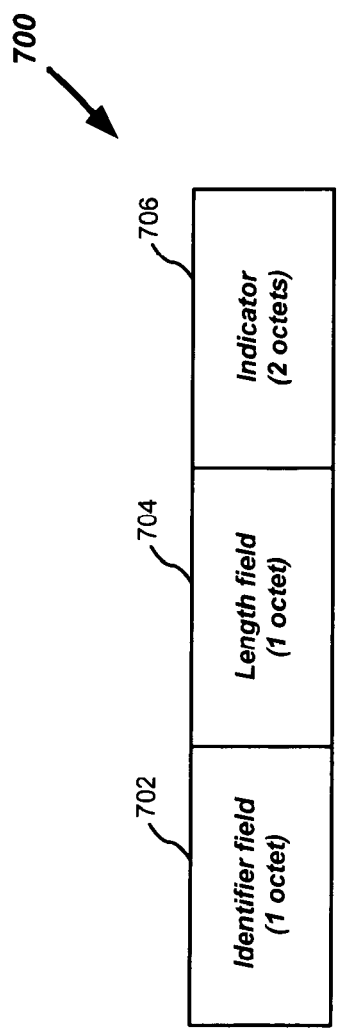
FIG. 7 is a diagram of an awake window information element.

FIG. 7 is a diagram of an awake window information element (IE) 700. As described herein, a beacon transmitted by a device in awake state 206 may include this information element. As shown in FIG. 7, awake window IE 700 includes an identifier (ID) field 702, a length field 704, and an awake window indicator field 706.

ID field 702 includes a predetermined value that identifies IE 700 as an awake window IE. Length field 704 indicates the size of IE 700. In embodiments, the start of an awake window is measured from TBTT. Thus, awake window indicator field 706 indicates the length (or time duration) of the awake window from this starting point (the sending of a beacon).

FIG. 7 shows that identifier field 702 may have a size of one octet, length field 704 may have a size of one octet, and awake window indicator field 706 may have a size of two octets. These sizes, as well as the format of FIG. 7, are shown for purposes of illustration, and not limitation. Accordingly, embodiments may employ other sizes and formats.

Figure 8:
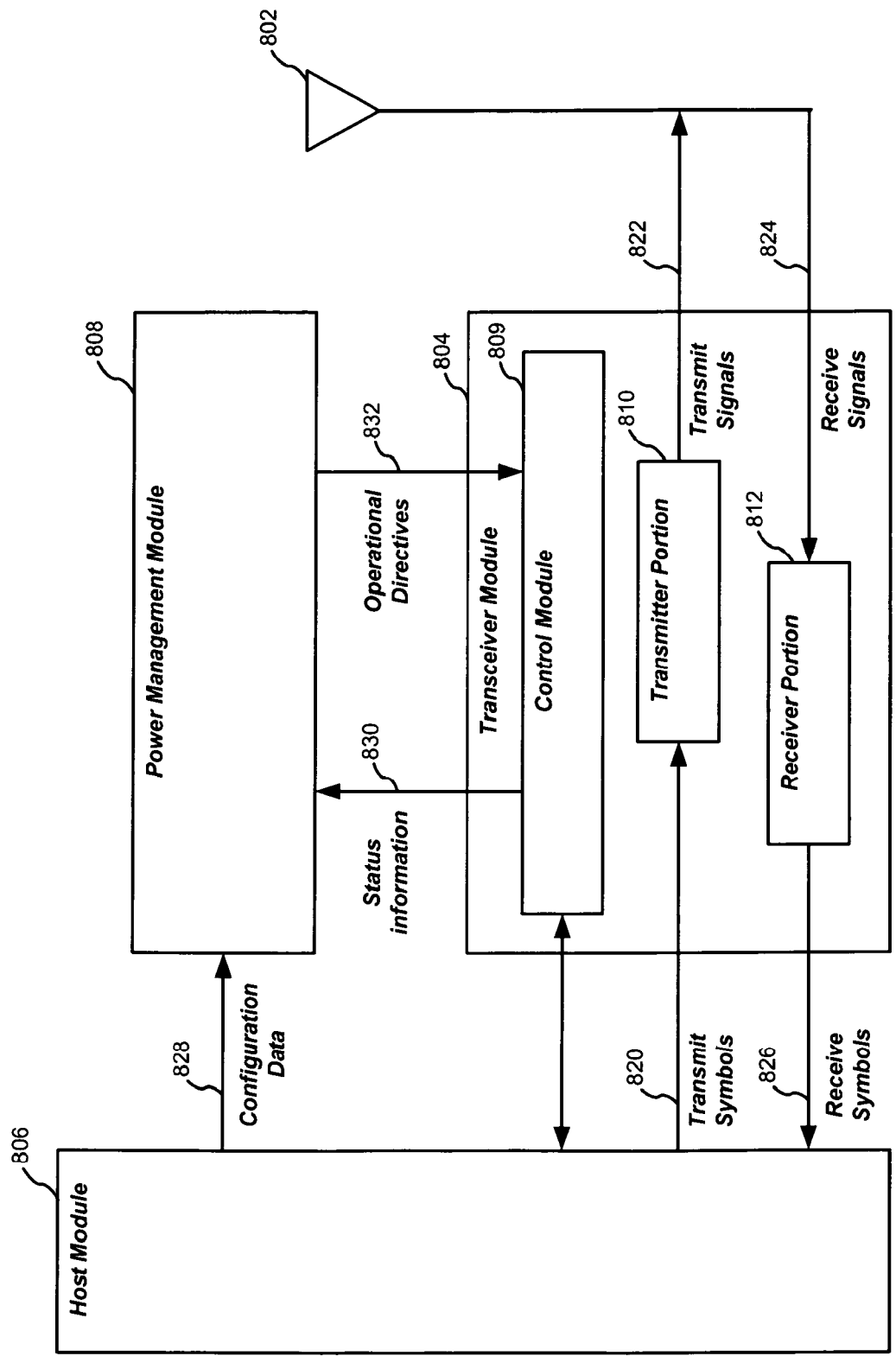
FIG. 8 is a diagram of an exemplary device implementation.

FIG. 8 is a diagram of an exemplary device implementation 800. This implementation may be employed by devices, such as mesh points. For example, this implementation may be employed by devices $102_1$-$102_{10}$ of FIG. 1. However, this implementation may be also employed in other contexts.

Implementation 800 may include various elements. For example, FIG. 8 shows implementation 800 including an antenna 802, a transceiver module 804, a host module 806, and a power control module 808. These elements may be implemented in hardware, software, firmware, or any combination thereof.

Antenna 802 provides for the exchange of wireless signals with remote devices. Although a single antenna is depicted, multiple antennas may be employed. For example, embodiments may employ one or more transmit antennas and one or more receive antennas. Alternatively or additionally, embodiments may employ multiple antennas for beamforming, and or phased-array antenna arrangements.

As shown in FIG. 8, transceiver module 804 includes a transmitter portion 810 and a receiver portion 812. During operation, transceiver module 804 provides an interface between antenna 802 and host module 806. For instance, transmitter portion 810 receives symbols 820 from host module 806 and generates corresponding signals 822 for wireless transmission by antenna module 802. This may involve operations, such as modulation, amplification, and/or filtering. However, other operations may be employed.

Conversely, receiver portion 812 obtains signals 824 received by antenna 802 and generates corresponding symbols 826. In turn, transceiver module 804 provides symbols 826 to host module 806. This generation of symbols 826 may involve operations, including (but not limited to) demodulation, amplification, and/or filtering.

To provide such features, transmitter portion 810 and receiver portion 812 may each include various components, such as modulators, demodulators, amplifiers, filters, buffers, upconverters, and/or downconverters. Such components may be implemented in hardware (e.g., electronics), software, or any combination thereof.

The symbols exchanged between host module 806 and transceiver module 804 may form messages or information associated with one or more protocols, and/or one or more user applications. Thus, host module 806 may perform operations corresponding to such protocol(s) and/or user application(s). Exemplary protocols include various media access control, network, transport and/or session layer protocols. Exemplary user applications include telephony, messaging, e-mail, web browsing, content (e.g., video and audio) distribution/reception, and so forth.

Signals 822 and 824 may be in various formats. For instance, these signals may be formatted for transmission in IEEE 802.11s networks. However, embodiments are not limited to these exemplary networks.

In addition to operating as an interface between host module 806 and antenna 802, transceiver module 804 may perform various signaling, link control, and media access operations. For instance, transceiver module 804 may generate and transmit beacons (via antenna 802), as well as exchange signaling messages (e.g., trigger messages, PLO messages, PLC messages, and so forth). These operations may be coordinated by a control module 809 within transceiver module 804. As shown in FIG. 8, control module 809 is coupled to transmitter portion 810 and receiver portion 812.

Also, FIG. 8 shows that control module 809 is coupled to host module 806 and power management module 808. Accordingly, control module 809 may exchange information with these elements. Such information may include status information sent by control module 809 and operational directives received by host module 806 and/or power management module 808.

Power control module 808 governs various operations of apparatus 800. For instance, power control module 808 establishes current operational modes and states of apparatus 800 (e.g., active mode 202, power saving mode 204, awake state 206, and doze state 208). As shown in FIG. 8, this may be carried out through operational directives 832, which are sent to control module 809 within transceiver module 804.

Power control module 808 may establish these modes and states based on various factors. Examples of such factors include (but are not limited to) status information 830 that it receives from transceiver module 804, and/or configuration data 828 that it receives from host module 806.

Configuration data 828 may include power management policies and procedures for power management module 808 to apply. Such policies and procedures may include parameters such as beacon intervals, wakeup intervals, awake windows, and so forth. In embodiments, configuration data 828 may be based (at least in part) on user settings and selections.

Status information 830 may indicate current operational status of transceiver module 804. For instance, status information 830 may indicate pending peer establishment processes. As described herein, such processes may affect how long a device operates in awake state 206. However, in embodiments, status information 830 may additionally or alternatively include other forms of information.

Figure 9:
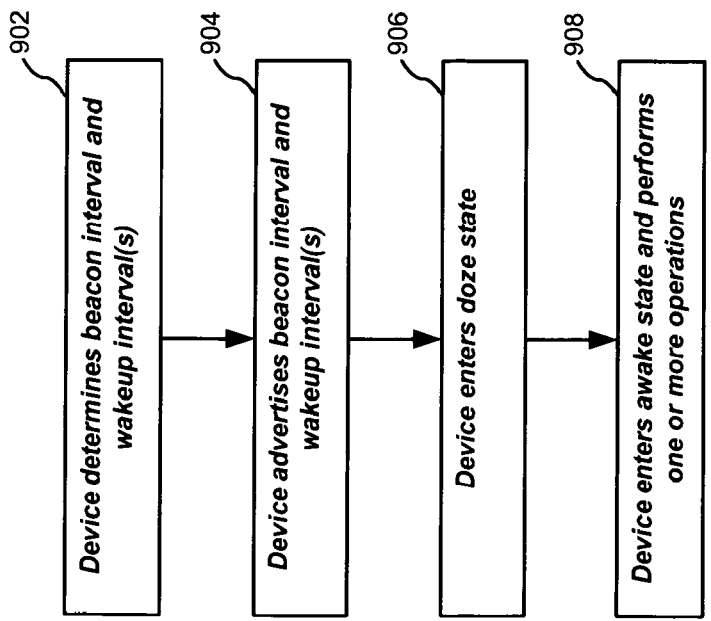
FIG. 9 is a flow diagram.

FIG. 9 illustrates a logic flow 900, which may be representative of the operations executed by one or more embodiments described herein. Although FIG. 9 shows a particular sequence, other sequences may be employed. Also, the depicted operations may be performed in various parallel and/or sequential combinations.

These operations are described with reference to a device. This device may be a mesh point, such as one of MPs $102_1$-$102_{10}$ in FIG. 1. Accordingly, this device may include the implementation of FIG. 8. Embodiments, however, are not limited to these devices and implementations.

At a block 902, the device determines a beacon interval and a wakeup interval.

Following this determination, the device advertises the beacon interval and wakeup interval to other devices at a block 904. In embodiments, this advertisement is performed while the device is awake (e.g., while in active mode 202 or while in awake state 206).

At a block 906 the device enters a doze state. From this doze state, the device enters an awake state at block 908. While in this awake state, the device may perform various operation(s). Exemplary operations are described below with reference to FIG. 3. For instance, the device may transmit data, receive data, and/or engage in peer establishment processes with remote devices. Embodiments, however, are not limited to these operations.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For example, the techniques described herein are not limited to IEEE 802.11s networks.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A device comprising:
   memory; and
   circuitry coupled with the memory to demodulate a beacon frame from a peer mesh point (MP), the beacon frame comprising an awake window information element, the awake window information element to comprise an identifier field, a length field, and an awake window field, the awake window field comprising an awake window value to indicate a time duration of an awake window for the peer MP, and to determine how long the peer mesh point will remain awake after sending the beacon frame by determination of the time duration, wherein the awake window information element is 4 octets long; the identifier field is 1 octet long; the length field is 1 octet long; and the awake window field is 2 octets long; the beacon frame to comprise a traffic indication map (TIM) element indicating whether the peer MP has buffered traffic for the device.

2. The device of claim 1, further comprising a receiver portion coupled with the circuitry and coupled with an antenna to receive the beacon frame.

3. The device of claim 2, the circuitry comprising a processor.

4. The device of claim 1, wherein the beacon frame further comprises a beacon interval, the beacon interval to indicate a time interval between consecutive beacon transmissions of the device.

5. The device of claim 1, wherein the beacon frame further comprises a beacon interval, the beacon interval to indicate a time interval between consecutive beacon transmissions of another device.

6. The device of claim 1, the identifier field to comprise an identifier value to indicate the awake window information element.

7. The device of claim 1, the length field to comprise a length value to indicate a length for the awake window value.

8. The device of claim 1, the circuitry to direct the device to enter an awake state when an awake window time period for the device is active.

9. The device of claim 1, the beacon frame comprising a delivery traffic indication message (DTIM) beacon.

10. At least one non-transitory computer-readable storage medium comprising a set of instructions that, in response to being executed at a processor for a wireless communication device, cause the processor to:
    demodulate a beacon frame from a peer mesh point (MP), the beacon frame comprising an awake window information element, the awake window information element to comprise an identifier field, a length field, and an awake window field, the awake window field comprising an awake window value to indicate a time duration of an awake window for the peer MP; and
    determine how long the peer MP will remain awake after sending the beacon frame by determination of the time duration;

wherein the awake window information element is 4 octets long; the identifier field is 1 octet long; the length field is 1 octet long; and the awake window field is 2 octets long; and the beacon frame comprises a traffic indication map (TIM) element indicating whether the peer MP has buffered traffic for the wireless communication device.

11. The at least one non-transitory computer-readable storage medium of claim 10, wherein the instructions further cause the processor to receive the beacon frame via a receiver portion coupled with the processor and an antenna coupled with the receiver portion.

12. The at least one non-transitory computer-readable storage medium of claim 11, wherein the instructions further cause the processor to generate symbols based on signals of the beacon frame received via the receiver portion.

13. The at least one non-transitory computer-readable storage medium of claim 10, wherein the beacon frame further comprises a beacon interval, the beacon interval to indicate a time interval between consecutive beacon transmissions of the wireless communication device.

14. The at least one non-transitory computer-readable storage medium of claim 10, wherein the beacon frame further comprises a beacon interval, the beacon interval to indicate a time interval between consecutive beacon transmissions of another device.

15. The at least one non-transitory computer-readable storage medium of claim 10, the identifier field to comprise an identifier value to indicate the awake window information element.

16. The at least one non-transitory computer-readable storage medium of claim 10, the length field to comprise a length value to indicate a length for the awake window value.

17. The at least one non-transitory computer-readable storage medium of claim 10, the processor to direct the wireless communication device to enter a awake state when an awake window time period for the wireless communication device is active.

18. The at least one non-transitory computer-readable storage medium of claim 10, the beacon frame comprising a delivery traffic indication message (DTIM) beacon.

19. A device comprising:
memory; and
circuitry coupled with the memory to determine how long a peer mesh point (MP) will remain awake after sending a beacon frame by determination of a time duration and to generate the beacon frame comprising an awake window information element, the awake window information element to comprise an identifier field, a length field, and an awake window field, the awake window field comprising an awake window value to indicate the time duration of an awake window for the peer MP, wherein the awake window information element is 4 octets long; the identifier field is 1 octet long; the length field is 1 octet long; and the awake window field is 2 octets long; the beacon frame to comprise a traffic indication map (TIM) element indicating whether the device has buffered traffic for the peer MP.

20. The device of claim 19, further comprising a transmitter portion coupled with the circuitry and coupled with an antenna to transmit the beacon frame.

21. The device of claim 20, the circuitry comprising a processor.

22. The device of claim 19, wherein the beacon frame further comprises a beacon interval, the beacon interval to indicate a time interval between consecutive beacon transmissions of the device.

23. The device of claim 19, wherein the beacon frame further comprises a beacon interval, the beacon interval to indicate a time interval between consecutive beacon transmissions of another device.

24. The device of claim 19, the identifier field to comprise an identifier value to indicate the awake window information element.

25. The device of claim 19, the length field to comprise a length value to indicate a length for the awake window value.

26. The device of claim 19, the circuitry to direct the device to enter a awake state when an awake window time period for the device is active.

27. The device of claim 19, the beacon frame comprising a delivery traffic indication message (DTIM) beacon.

28. At least one non-transitory computer-readable storage medium comprising a set of instructions that, in response to being executed at a processor for a wireless communication device, cause the processor to:
determine how long a peer mesh point (MP) will remain awake after sending a beacon frame by determination of a time duration and
generate the beacon frame comprising an awake window information element, the awake window information element to comprise an identifier field, a length field, and an awake window field, the awake window field comprising an awake window value to indicate the time duration of an awake window for the peer MP;
wherein the awake window information element is 4 octets long; the identifier field is 1 octet long; the length field is 1 octet long; and the awake window field is 2 octets long; and
the beacon frame comprises a traffic indication map (TIM) element indicating whether the wireless communication device has buffered traffic for the peer MP.

29. The at least one non-transitory computer-readable storage medium of claim 28, wherein the instructions further cause the processor to transmit the beacon frame via a transmitter portion coupled with the processor and an antenna coupled with the transmitter portion.

30. The at least one non-transitory computer-readable storage medium of claim 29, wherein the instructions further cause the processor to generate signals based on symbols of the beacon frame to transmit via the transmitter portion.

31. The at least one non-transitory computer-readable storage medium of claim 28, wherein the beacon frame further comprises a beacon interval, the beacon interval to indicate a time interval between consecutive beacon transmissions of the wireless communication device.

32. The at least one non-transitory computer-readable storage medium of claim 28, wherein the beacon frame further comprises a beacon interval, the beacon interval to indicate a time interval between consecutive beacon transmissions of another device.

33. The at least one non-transitory computer-readable storage medium of claim 28, the identifier field to comprise an identifier value to indicate the awake window information element.

34. The at least one non-transitory computer-readable storage medium of claim 28, the length field to comprise a length value to indicate a length for the awake window value.

35. The at least one non-transitory computer-readable storage medium of claim 28, the processor to direct the wireless communication device to enter the awake state when an awake window time period for the wireless communication device is active.

36. The at least one non-transitory computer-readable storage medium of claim 28, the beacon frame comprising a delivery traffic indication message (DTIM) beacon.

* * * * *